(12) United States Patent
Kasahara et al.

(10) Patent No.: US 11,195,307 B2
(45) Date of Patent: Dec. 7, 2021

(54) IMAGE PROCESSING APPARATUS, IMAGE PROCESSING METHOD, AND PROGRAM

(71) Applicant: SONY CORPORATION, Tokyo (JP)

(72) Inventors: Shunichi Kasahara, Kanagawa (JP); Ken Miyashita, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/511,813

(22) Filed: Jul. 15, 2019

(65) Prior Publication Data
US 2019/0340790 A1 Nov. 7, 2019

Related U.S. Application Data

(63) Continuation of application No. 15/635,813, filed on Jun. 28, 2017, now Pat. No. 10,360,696, which is a (Continued)

(30) Foreign Application Priority Data

Mar. 31, 2011 (JP) ................................ 2011-078076

(51) Int. Cl.
G06T 11/00 (2006.01)
G06T 15/20 (2011.01)
(Continued)

(52) U.S. Cl.
CPC ............. G06T 11/00 (2013.01); G06F 3/012 (2013.01); G06F 3/013 (2013.01); G06F 3/017 (2013.01);
(Continued)

(58) Field of Classification Search
CPC ... G06T 11/00; G06T 7/70; G06T 3/60; G06T 19/006; G06T 3/0012; G06T 15/205;
(Continued)

(56) References Cited

U.S. PATENT DOCUMENTS 6,020,891 A * 2/2000 Rekimoto ........... G06F 3/04815
345/419
6,084,594 A * 7/2000 Goto ....................... G06F 3/147
345/427

(Continued)

FOREIGN PATENT DOCUMENTS

| CN | 1607824 A | 4/2005 |
| CN | 1671176 A | 9/2005 |

(Continued)

OTHER PUBLICATIONS

Feb. 15, 2017, EP communication issued for related EP application No. 12161101.6.

(Continued)

Primary Examiner — Wesley J Tucker
(74) Attorney, Agent, or Firm — Paratus Law Group, PLLC

(57) ABSTRACT

Aspects of the present invention include an apparatus including a memory storing instructions, and a control unit configured to execute the instructions to detect an image of an object of interest within an image of real space, detect an orientation of the real space object image with respect to a real space user perspective, generate a modified image comprising an image of a modified object, corresponding to the real space object, such that an orientation of the modified object image corresponds to a desired user perspective, and display the modified image.

9 Claims, 11 Drawing Sheets

Related U.S. Application Data continuation of application No. 15/239,235, filed on Aug. 17, 2016, now Pat. No. 9,715,743, which is a continuation of application No. 13/431,502, filed on Mar. 27, 2012, now Pat. No. 9,443,348.

(51) Int. Cl.

| | |
|---|---|
| *G06F 3/01* | (2006.01) |
| *G06T 3/00* | (2006.01) |
| *H04N 5/225* | (2006.01) |
| *G06T 7/70* | (2017.01) |
| *G06T 3/60* | (2006.01) |
| *G06T 19/00* | (2011.01) |

(52) U.S. Cl.
CPC .............. *G06T 3/0012* (2013.01); *G06T 3/60* (2013.01); *G06T 7/70* (2017.01); *G06T 15/20* (2013.01); *G06T 15/205* (2013.01); *G06T 19/006* (2013.01); *H04N 5/225* (2013.01); *G06T 2215/16* (2013.01)

(58) Field of Classification Search
CPC ..... G06T 15/20; G06T 2215/16; G06F 3/013; G06F 3/012; G06F 3/017; H04N 5/225
See application file for complete search history.

(56) References Cited

U.S. PATENT DOCUMENTS

| | | | |
|---|---|---|---|
| 6,661,426 B1 | 12/2003 | Jetha et al. | |
| 8,120,665 B2 | 2/2012 | Maruyama et al. | |
| 8,744,170 B2 | 6/2014 | Kato et al. | |
| 8,805,077 B2 | 8/2014 | Guo et al. | |
| 9,412,015 B2 | 8/2016 | Ishida | |
| 9,430,038 B2* | 8/2016 | Ebstyne | G06F 3/011 |
| 2003/0206166 A1* | 11/2003 | Kamata | G06T 15/10 |
| | | | 345/427 |
| 2005/0078200 A1 | 4/2005 | Morichika | |
| 2005/0206753 A1 | 9/2005 | Sakurai et al. | |
| 2008/0194323 A1* | 8/2008 | Merkli | A63F 13/12 |
| | | | 463/30 |
| 2008/0204778 A1 | 8/2008 | Koarai | |
| 2009/0225180 A1 | 9/2009 | Maruyama et al. | |
| 2011/0091092 A1 | 4/2011 | Nepomniachtchi et al. | |
| 2011/0304616 A1* | 12/2011 | Ham | G02B 30/24 |
| | | | 345/419 |
| 2012/0092328 A1* | 4/2012 | Flaks | G02B 27/017 |
| | | | 345/419 |
| 2012/0113141 A1 | 5/2012 | Zimmerman et al. | |
| 2012/0127284 A1* | 5/2012 | Bar-Zeev | G02B 27/017 |
| | | | 348/53 |
| 2012/0256956 A1 | 10/2012 | Kasahara | |
| 2012/0275755 A1 | 11/2012 | Southworth | |
| 2012/0314942 A1 | 12/2012 | Williams et al. | |
| 2013/0016102 A1 | 1/2013 | Look et al. | |
| 2013/0022231 A1 | 1/2013 | Nepomniachtchi et al. | |
| 2013/0033618 A1 | 2/2013 | Kato et al. | |
| 2013/0120224 A1 | 5/2013 | Cajigas et al. | |
| 2014/0225898 A1 | 8/2014 | Fyke et al. | |
| 2015/0040074 A1 | 2/2015 | Hofmann et al. | |
| 2016/0210784 A1 | 7/2016 | Ramsby et al. | |
| 2017/0358138 A1 | 12/2017 | Dack et al. | |

FOREIGN PATENT DOCUMENTS

| | | |
|---|---|---|
| CN | 101248454 A | 8/2008 |
| CN | 101257549 A | 9/2008 |
| EP | 1577832 A2 | 9/2005 |
| JP | 09-289610 | 11/1997 |
| JP | 2007-058634 | 3/2007 |
| JP | 2009-133082 | 6/2009 |
| JP | 2009-210432 | 9/2009 |
| JP | 2010-202018 | 9/2010 |
| WO | WO2011/007683 A1 | 1/2011 |

OTHER PUBLICATIONS

N. Allezard., et al., Recognition of 3D Textured Objects by Mixing View-Based and Model-Based Representations, Sep. 2000, IEEE, pp. 960-963.
Oct. 19, 2016, CN communication issued for related CN application No. 201210080534.0.
Dec. 3, 2015, Chinese Office Action for related CN Application No. 201210080534.0.
Nov. 11, 2014, Japanese Office Action for related JP application No. 2011-078076.

* cited by examiner

DRAG ON SCREEN
→VIRTUAL OBJECT IS SCROLLED

IMAGE PROCESSING APPARATUS, IMAGE PROCESSING METHOD, AND PROGRAM

CROSS REFERENCE TO PRIOR APPLICATION

This application is a continuation of U.S. patent application Ser. No. 15/635,813 (filed on Jun. 28, 2017), which is a continuation of U.S. patent application Ser. No. 15/239,235 (filed on Aug. 17, 2016 and issued as U.S. Pat. No. 9,715,743 on Jul. 25, 2017), which is a continuation of U.S. patent application Ser. No. 13/431,502 (filed on Mar. 27, 2012 and issued as U.S. Pat. No. 9,443,348 on Sep. 13, 2016), which claims priority to Japanese Patent Application No. 2011-078076 (filed on Mar. 31, 2011), which are all hereby incorporated by reference in their entirety.

BACKGROUND

The present disclosure relates to an image processing apparatus, an image processing method, and a program.

Various types of information expressed in the form of texts, diagrams, symbols, images, or the like are present in the real world. These pieces of information are often presented in a manner best viewed from the front and/or from a particular orientation.

For example, JP 2010-202018A discloses a technology for assisting driving by recognizing the characters of traffic signs present in the periphery of a car. Also in this technology, the characters on the boards are assumed to be captured from the front. That it is preferable to view information from the front when visually reading the information is equally true for a case where the subject that reads the information is a person and a case where the subject is a computer.

SUMMARY

However, in the real world, users of information may not be optimally oriented with respect to the objects to receive printed or other information. Therefore, it would be beneficial if the surface of a real object expressing information can be easily made to face the direction of the reader or user of the information.

Aspects of the present invention include an apparatus comprising a memory storing instructions, and a control unit. The control unit may be configured to execute the instructions to detect an image of an object of interest within an image of real space, detect an orientation of the real space object image with respect to a real space user perspective, generate a modified image comprising an image of a modified object, corresponding to the real space object, such that an orientation of the modified object image corresponds to a desired user perspective, and display the modified image.

Aspects of the present invention also include a method comprising detecting an image of an object of interest within an image of real space. The method may further comprise detecting an orientation of the real space object image with respect to a real space user perspective, generating a modified image comprising an image of a modified object, corresponding to the real space object, such that an orientation of the modified object image corresponds to a desired user perspective, and displaying the modified image.

Aspects of the present invention further include a tangibly embodied non-transitory computer-readable medium storing instructions which, when executed by a processor, perform a method comprising detecting an image of an object of interest within an image of real space. The method may further comprise detecting an orientation of the real space object image with respect to a real space user perspective, generating a modified image comprising an image of a modified object, corresponding to the real space object, such that an orientation of the modified object image corresponds to a desired user perspective, and displaying the modified image.

The technology disclosed in the present specification enables to easily make the surface of a real object expressing information face the direction of the reader, for example a user of information.

DETAILED DESCRIPTION OF THE EMBODIMENTS

Figure 1:
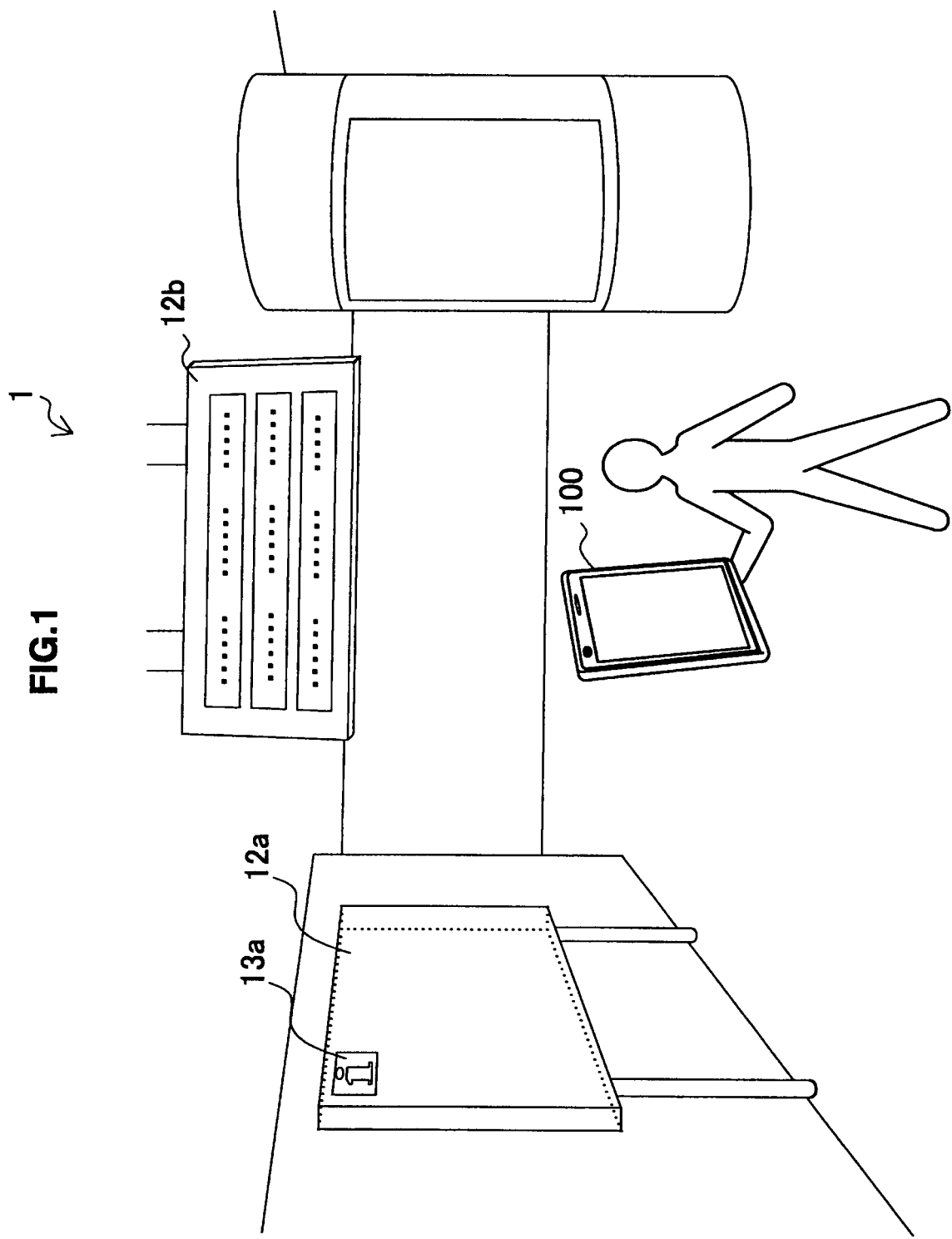
FIG. 1 is a diagram for describing an overview of an image processing apparatus according to an embodiment.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

1. Overview

FIG. 1 is an explanatory diagram for describing an overview of an embodiment of the technology disclosed in the present specification. Referring to FIG. 1, an image processing apparatus 100 carried by a user in a real space 1 is shown.

The image processing apparatus 100 may display an image obtained by capturing the real space on a screen. The image processing apparatus 100 may be a user device such as a smartphone, a PDA (Personal Digital Assistant), a game terminal, or a portable music player, or it may be an information processing apparatus such as a PC (Personal Computer) or a workstation, for example. The image may also include other devices such as servers, which may be remotely accessed by a user The real space 1 is an example of a space in which the image processing apparatus 100 can be used. Real objects 12a and 12b are present in the real space 1. The real object 12a is a board for announcements. It is to be understood, however, that real objects 12a and 12b, and the other real object provided in the description that follows, are merely exemplary. A real object may be any object of interest to a user. A symbol mark 13a is attached to the real object 12a. The real object 12b is a bulletin board for information display. The image processing apparatus 100 acquires an image obtained by capturing such a real space 1, and displays the acquired image on the screen of the image processing apparatus 100. The front faces of the real object 12a and 12b do not necessarily coincide with the optical axis direction of a device capturing an image. Here the optical axis direction of a device capturing the image may determine a user perspective, if the device capturing the image is a user image capture device. As used herein, "perspective" means the appearance of objects in a scene, as viewed by a user at a specified position and direction of view. Accordingly, if the captured image is displayed on the screen as it is, a user may not be able to correctly read the information shown on the image (for example, the information drawn on the real object 12a or the information presented by the real object 12b). Such may happen if, for example, a user perspective (e.g., the optical axis direction of the device, in certain cases) and an orientation of real object 12a are not in a proper relationship. Thus, as will be described in detail from the following section, the image processing apparatus 100 according to the present embodiment processes the image to create a "modified image" so that the base plane of the real object (e.g., "orientation of the object") shown in the image faces the image plane (e.g., a desired user perspective), and thereby increases the visibility of the information shown in the image, e.g., by aligning the orientation of the object with the desired user perspective. Generating a "modified image" may also or alternatively include modifying an orientation of the object. The modifying of the orientation of the object may include any of the example modifications described herein as well as any other suitable modification. For example, the modifying of the orientation of the object may include applying a "pseudo-modification" of the orientation of the object within an image of real space, such as by applying a transformation to the image of real space. It is to be understood that any of the operations described herein (e.g., image processing, etc.) may be performed locally on a user device and/or may be performed remotely, such as by a server that is remote to the user device (e.g., a "remote server").

Figure 2:
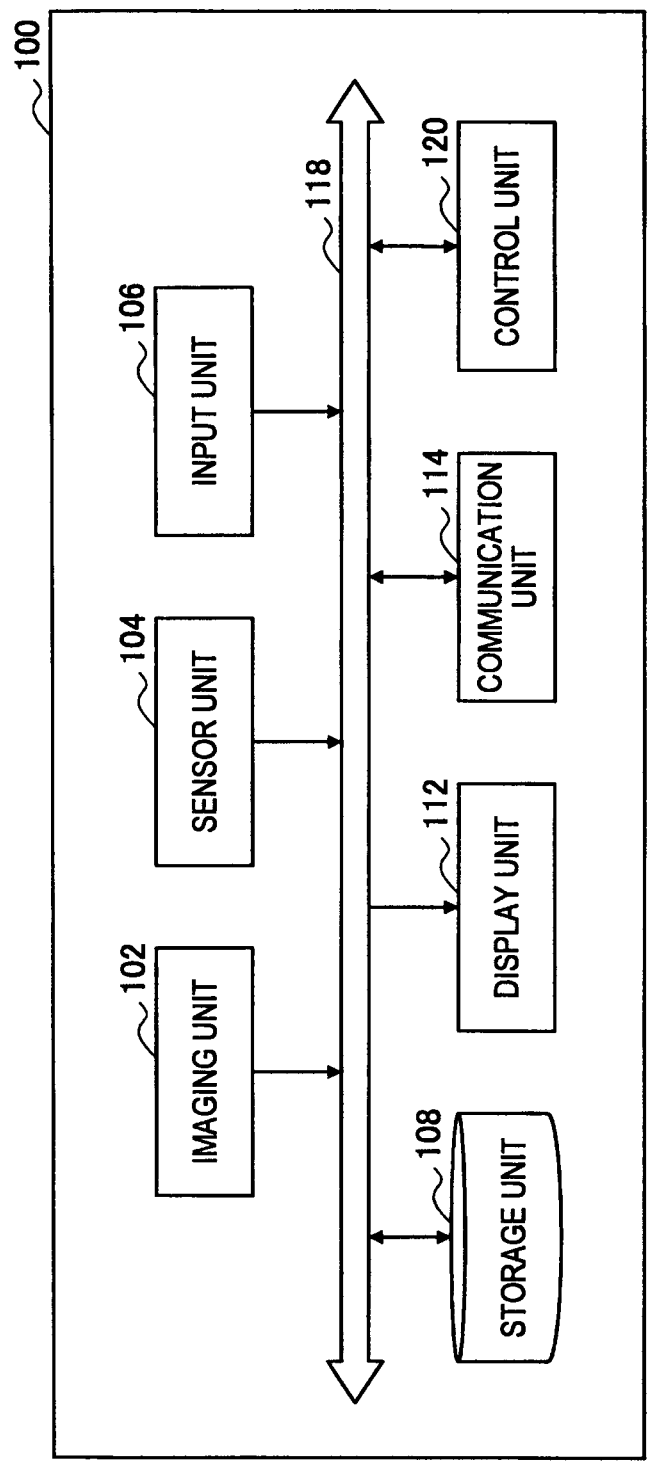
FIG. 2 is a block diagram showing an example of the hardware configuration of an image processing apparatus according to an embodiment.

2. Example Configuration of Image Processing Apparatus According to an Embodiment 2-1. Hardware Configuration FIG. 2 is a block diagram showing an example of the hardware configuration of the image processing apparatus 100 according to the present embodiment. Referring to FIG. 2, the image processing apparatus 100 includes an imaging unit 102, a sensor unit 104, an input unit 106, a storage unit 108, a display unit 112, a communication unit 114, a bus 118, and a control unit 120.

Imaging Unit

The imaging unit 102 may include a camera module for capturing an image. The imaging unit 102 captures an image of real space by using an image sensor such as a CCD (Charge Coupled Device) or a CMOS (Complementary Metal Oxide Semiconductor), and generates a captured image. The imaging unit 102 may also include both or one of an imaging circuit for video input and an imaging circuit for still image input.

Sensor Unit

The sensor unit 104 is a group of sensors for supporting recognition of the position and the attitude of the image processing apparatus 100, and detecting a part of user inputs to the image processing apparatus 100. For example, the sensor unit 104 may include a GPS sensor that receives a GPS (Global Positioning System) signal and measures the latitude, the longitude, and the altitude of the image processing apparatus 100. Also, the sensor unit 104 may include a positioning sensor that measures the position of the image processing apparatus 100 based on, for example, the intensity of a radio signal received from a wireless access point. Furthermore, the sensor unit 104 may include a motion sensor, such as an acceleration sensor that measures the three-axis acceleration of the image processing apparatus 100 or a gyro sensor that measures the tilt angle.

Input Unit

The input unit 106 is an input device used by a user to operate the image processing apparatus 100 or to input information to the image processing apparatus 100. Typically, the input unit 106 includes a touch sensor that detects a touch of a user on the screen of the display unit 112. Alternatively (or in addition thereto), the input unit 106 may include a pointing device such as a mouse or a touchpad, a gesture recognition module that recognizes the gesture of a user shown in the image, or a line-of-sight detection module that detects the direction of the line of sight of a user wearing a head-mounted display (HMD). Furthermore, the input unit 106 may include other types of input devices such as a keyboard, a key pad, a button, a switch, and the like.

Storage Unit

The storage unit 108 may include a storage medium such as a semiconductor memory, a hard disk, or the like, and stores program and data to be used for processing by the image processing apparatus 100. The data to be stored in the storage unit 108 may include, for example, image data generated by the imaging unit 102 and sensor data generated by the sensor unit 104. Data to be stored in the storage unit 108 may also include, for example, model data used at the time of recognition of a real object shown in the image.

Display Unit

The display unit 112 is a display module that is configured from an LCD (Liquid Crystal Display), an OLED (Organic Light-Emitting Diode), a CRT (Cathode Ray Tube), or the like. The display unit 112 displays on a screen an image captured by the imaging unit 102 or an image to be processed by the control unit 120, for example.

Communication Unit

The communication unit 114 may include a communication interface that intermediates communication by the image processing apparatus 100 with another device. The communication unit 114 may support an arbitrary wireless communication protocol or wired communication protocol, and establishes a communication connection to another device.

Bus

The bus 118 may connect the imaging unit 102, the sensor unit 104, the input unit 106, the storage unit 108, the display unit 112, the communication unit 114, and the control unit 120 with each other.

Control Unit

The control unit 120 may include a processor such as a CPU (Central Processing Unit), a DSP (Digital Signal Processor), or the like. The control unit 120 executes a program stored in the storage unit 108 or in another storage medium, and causes various functions of the image processing apparatus 100.

2-2. Functional Configuration

Figure 3:
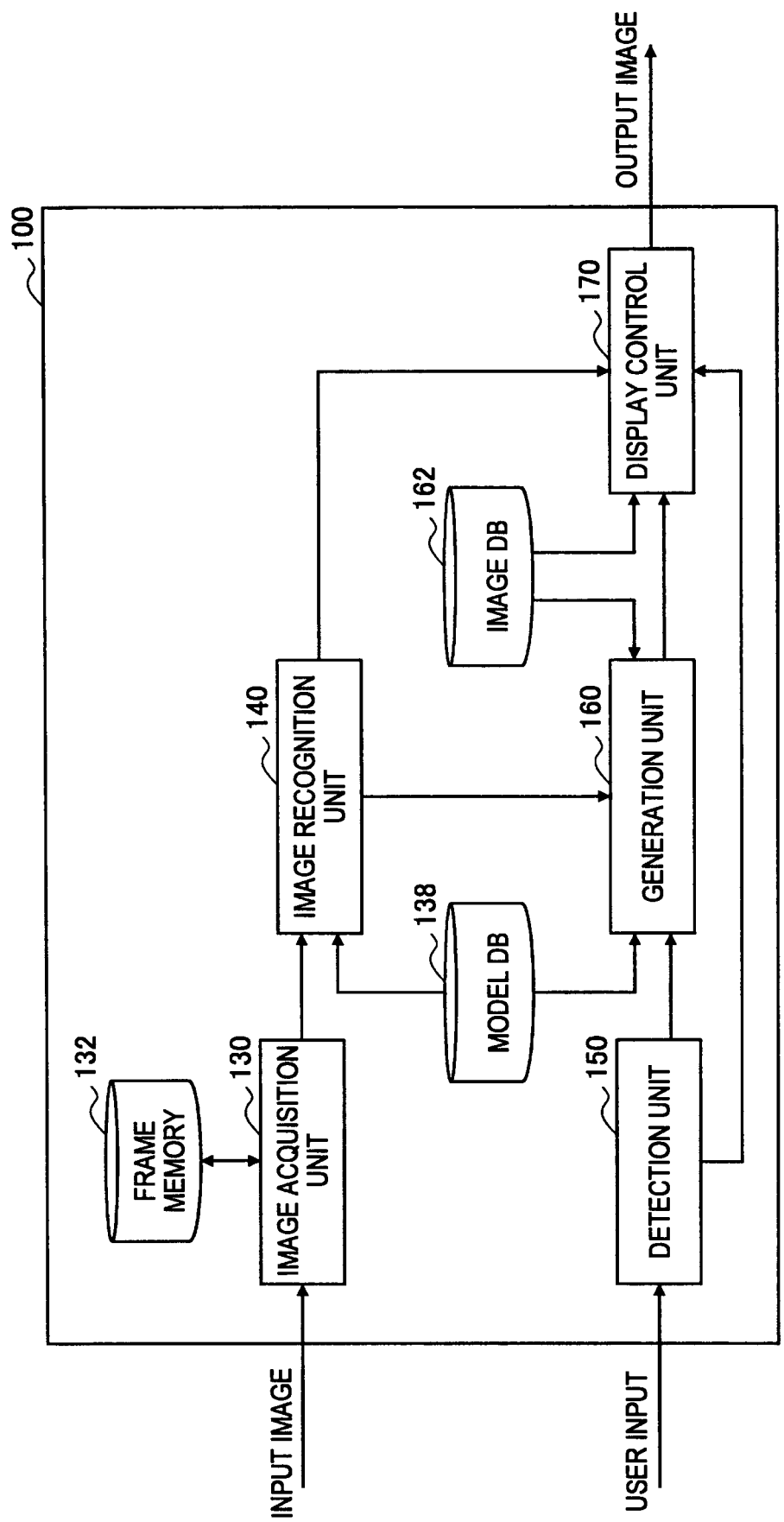
FIG. 3 is a block diagram showing an example of the configuration of the logical function of an image processing apparatus according to an embodiment.

FIG. 3 is a block diagram showing an exemplary configuration of logical function realized by the storage unit 108 and the control unit 120 of the image processing apparatus 100 shown in FIG. 2. Referring to FIG. 3, the image processing apparatus 100 includes an image acquisition unit 130, a frame memory 132, a model database (DB) 138, an image recognition unit 140, a detection unit 150, a generation unit 160, an image DB 162, and a display control unit 170.

(1) Image Acquisition Unit

The image acquisition unit 130 may acquire an image showing a real space as an input image. The image acquisition unit 130 may also acquire the latest frame of a video input from the imaging unit 102 as the input image, for example. The image acquisition unit 130 may also acquire as the input image each frame of a video input that was captured in the past and that is stored in the storage unit 108 or a still image captured as a snapshot. The image acquisition unit 130 outputs the acquired input image to the image recognition unit 140.

(2) Model DB

The model DB 138 may include database in which model data regarding the shapes or appearances of real or other objects which are the targets of recognition by the image processing apparatus 100 is accumulated in advance. In the present embodiment, the targets of recognition by the image processing apparatus 100 are typically real objects having a surface on which certain information may be expressed, such as a board for advertisement, a board for announcements, a bulletin board, a poster, a screen, a traffic sign, and the like. The model data may include data defining the shapes of these real objects. The model data may also include image data of a symbol mark, a text label, or the like attached to these real objects. Furthermore, the model data may also include the data of feature quantity sets extracted from known images relating to these real objects.

(3) Image Recognition Unit

The image recognition unit 140 recognizes which real object is shown in the input image input from the image acquisition unit 130, and also the three-dimensional position and attitude of the real object shown in the input image. The position and attitude of the real object recognized by the image recognition unit 140 may include the relative position and attitude to the image plane of the device which has captured the input image. The image recognition unit 140 may check the set of feature points extracted from the input image against the shape of a real object that may be defined by the model data, for example. The image recognition unit 140 may also check image data of a symbol mark, a text label or the like that may be defined by the model data against the input image. The image recognition unit 140 may also check the feature quantity of the image of a known real object that may be defined by the model data against the feature quantity extracted from the input image. In any of the cases, the image recognition unit 140 may recognize that a real object having a more desirable match score than a threshold is shown in the input image at the position and with the attitude corresponding to the match score. Also, the image recognition unit 140 may simply recognize, without using the model data, a four-sided pattern appearing in the input image as a real object having a certain rectangular pattern, for example.

Figure 4:
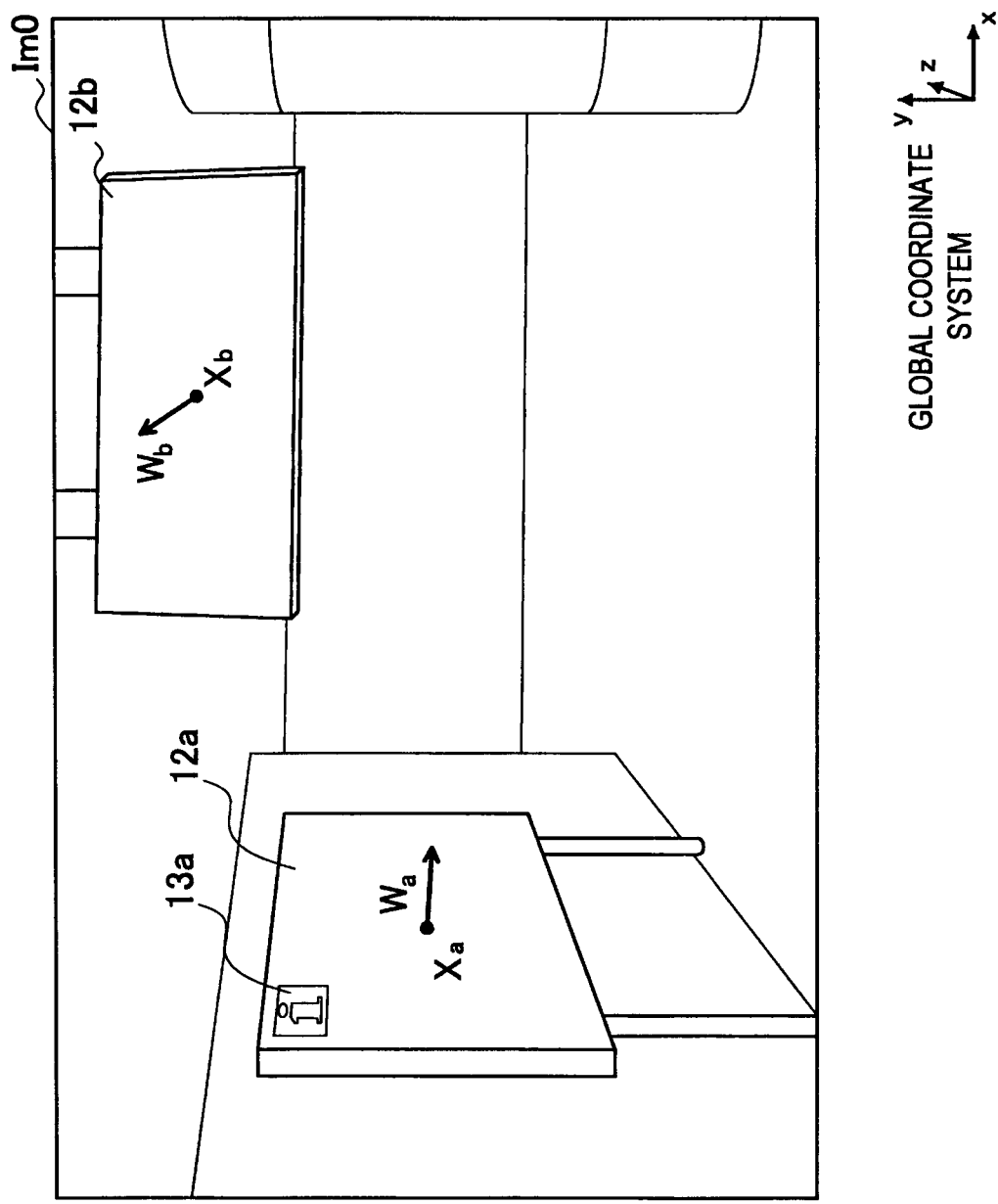
FIG. 4 is a diagram for describing an example of the result of recognition by an image recognition unit.

FIG. 4 is a diagram for describing an example of the result of recognition by the image recognition unit 140. Referring to FIG. 4, an exemplary input image Im0 to be input to the image recognition unit 140 is shown. The position $X_a$ and the attitude $W_a$ of the real object 12a, and the position $X_b$ and the attitude $W_b$ of the real object 12b shown in the input image Im0 may be recognized as a result of image recognition by the image recognition unit 140. The position X of each real object may be given as the position of the reference point (for example, the origin of a model coordinate system) of each real object by a three-dimensional global coordinate system (x, y, z). Global coordinate system may be a coordinate system indicating relative positional coordinates having the position of the image processing apparatus 100 as the origin. Alternatively, the global coordinate system may be a coordinate system that is fixedly defined in the real space. The attitude W of each real object may be given as a rotation matrix or a quaternion indicating the rotation of each real object relative to the global coordinate system. Additionally, in the present specification, the position X and the attitude W of each real object will be described as separate variates, for the sake of simplicity of explanation. However, the position X and the attitude W of each real object may also be expressed by one homogeneous transformation matrix with four rows and four columns indicating transformation between the global coordinate system and the model coordinate system of each real object. In this case, the position X and the attitude W of each real object may be extracted as necessary from the one homogeneous transformation matrix and be used. The image recognition unit 140 outputs an identifier, the position, and the attitude of each real object shown in the input image, which has been recognized in the above manner, to the generation unit 160, and the display control unit 170.

(4) Detection Unit

The detection unit 150 detects a user input, and outputs user input information to the generation unit 160. The user input (or "user operation") to be detected by the detection unit 150 may include, for example, various touch inputs to the touch sensor of the input unit 106 shown in FIG. 2 (for example, a touch, a tap, a double-tap, a drag, a flick, a pinch in, a pinch out, and the like). Furthermore, the user input to be detected by the detection unit 150 may also include the motion of the image processing apparatus 100 (for example, tilting, shaking, or the like) measured by the sensor group of the sensor unit 104 shown in FIG. 2, for example.

In the present embodiment, a first user input detected by the detection unit 150 may indicate a trigger for shifting from a normal display mode to an aligned display mode. Whereas an input image is displayed by a display device in the normal display mode, an image generated by the generation unit 160 described below may be displayed in the aligned display mode. A second user input detected by the detection unit 150 indicates the end of the aligned display mode. When the aligned display mode is over, the state of the image processing apparatus 100 is returned to the normal display mode, and an input image is again displayed. The first user input and the second user input may be any combination of various types of user inputs described above.

(5) Generation Unit

In the aligned display mode, the generation unit 160 processes an input image so that the base plane of the real object recognized by the image recognition unit 140 faces the image plane of the device which has captured the input image, and thereby generates a processed image. That a first plane "faces" a second plane means that the first plane appears substantially parallel with the second plane, for example. In the following description, a case will be mainly referred to in which the base plane of a real object is the front face of the real object and the processed image is an aligned image which has been processed such that the front face of the real object is aligned in parallel with the image plane. In the case the real object has a plane expressing certain information, the normal direction of the plane may correspond to the front face of the real object. As can be understood from the example of FIG. 4, if the attitude of the real object is determined, the direction of the front face of the real object can be determined based on the attitude. However, the base plane of the real object is not limited to such an example, and it may be a plane seen from the direction of the side, the top, the back, or the bottom of the real object, or from an angle. The base plane of the real object may be defined in advance in the model data using a model coordinate system unique to the real object, for example.

(5-1) Aligned Image Generation Method

As described above, in the present embodiment, many of the real objects recognized by the image recognition unit 140 are substantially planar real objects having a rectangular pattern on their shapes or appearances. However, in a state where the front face of the real object is not aligned in parallel with the image plane, the rectangular pattern of the real object indicates, in the image, a four-sided shape other than a rectangle. The generation unit 160 generates the aligned image in such a way that such a rectangular pattern of the real object appears substantially rectangular in the aligned image. In the following, two examples of the generation method of the aligned image by the generation unit 160 will be described with reference to FIGS. 5 and 6.

A first method takes as a premise that the image processing apparatus 100 uses three-dimensional rendering. In the three-dimensional rendering, a virtual graphics of a real object may be displayed based on the shape of the real object that is defined in three dimensions (model) and a virtual viewpoint (camera position). Accordingly, in the first method, the generation unit 160 generates the aligned image by three-dimensionally rotating the viewpoint or the recognized real object such that the viewpoint in the three-dimensional rendering is positioned in the front direction of the real object.

Figure 5A:
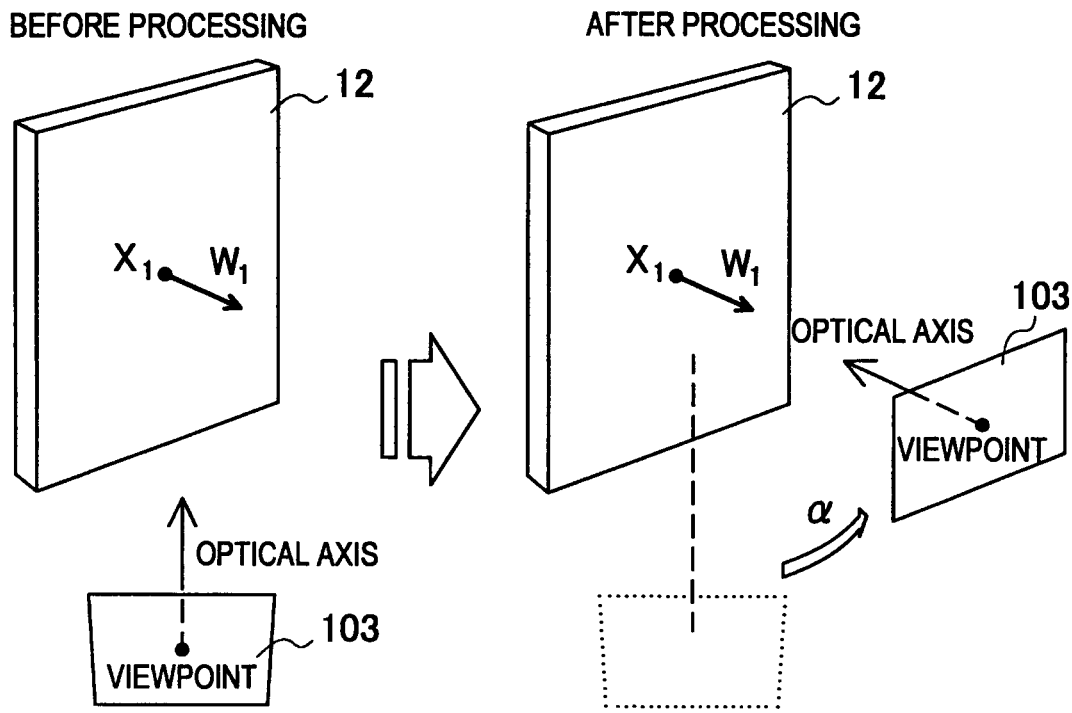
FIG. 5A is a first diagram for describing a first example of a generation method of an aligned image by a generation unit, in which a modified user perspective is implemented.
Figure 5B:
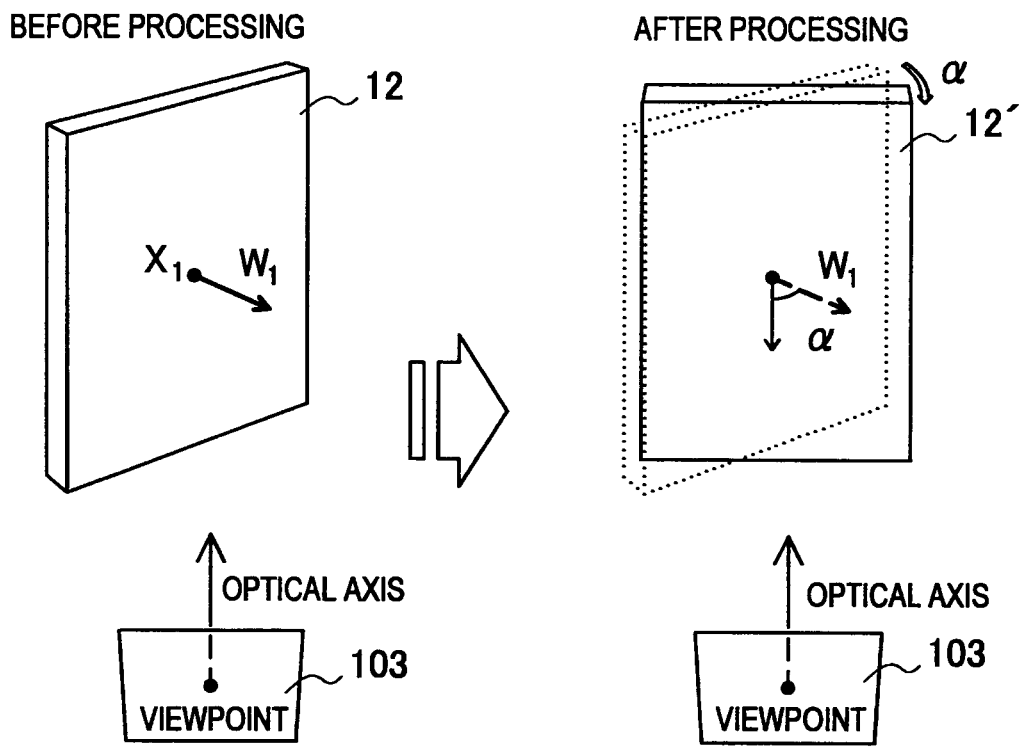
FIG. 5B is a second diagram for describing the first example of the generation method of an aligned image by the generation unit, in which an image of a modified object having an orientation different from an orientation of the real space object image is implemented.

FIGS. 5A and 5B are explanatory diagrams for describing a first example of the aligned image generation method. On the left of FIG. 5A, the positional relationship between a real object 12 shown in an input image and an image plane 103 of the image processing apparatus 100 is schematically shown. The viewpoint of the three-dimensional rendering is positioned behind the image plane 103. $X_1$ and $W_1$ each show the relative position and attitude of the real object 12 to the image plane 103. The position $X_1$ and the attitude $W_1$ are acquired as the results of recognition by the image recognition unit 140. The generation unit 160 rotates, in the virtual space of the three-dimensional rendering, the position of the viewpoint by the amount of rotation α corresponding to the attitude $W_1$. Thus, a modified image is generated, as viewed from a modified user perspective. The viewpoint is thereby placed in the front of the real object 12, and the aligned image can be generated by the rendering.

On the left of FIG. 5B, the positional relationship between the real object 12 and the image plane 103 of the image processing apparatus 100 that are the same as those of FIG. 5A is again shown. The generation unit 160 may rotate, in the virtual space of the three-dimensional rendering, the real object by the amount of rotation α corresponding to the attitude $W_1$. Thus, an image is generated of a modified object having an orientation different from the orientation of a real space object image. Also in this case, the viewpoint may be placed in front of the real object 12, and the aligned image can be generated by rendering. As a result, the rectangular pattern on the front face of the real object 12 may be displayed to be rectangular on the aligned image.

Figure 6:
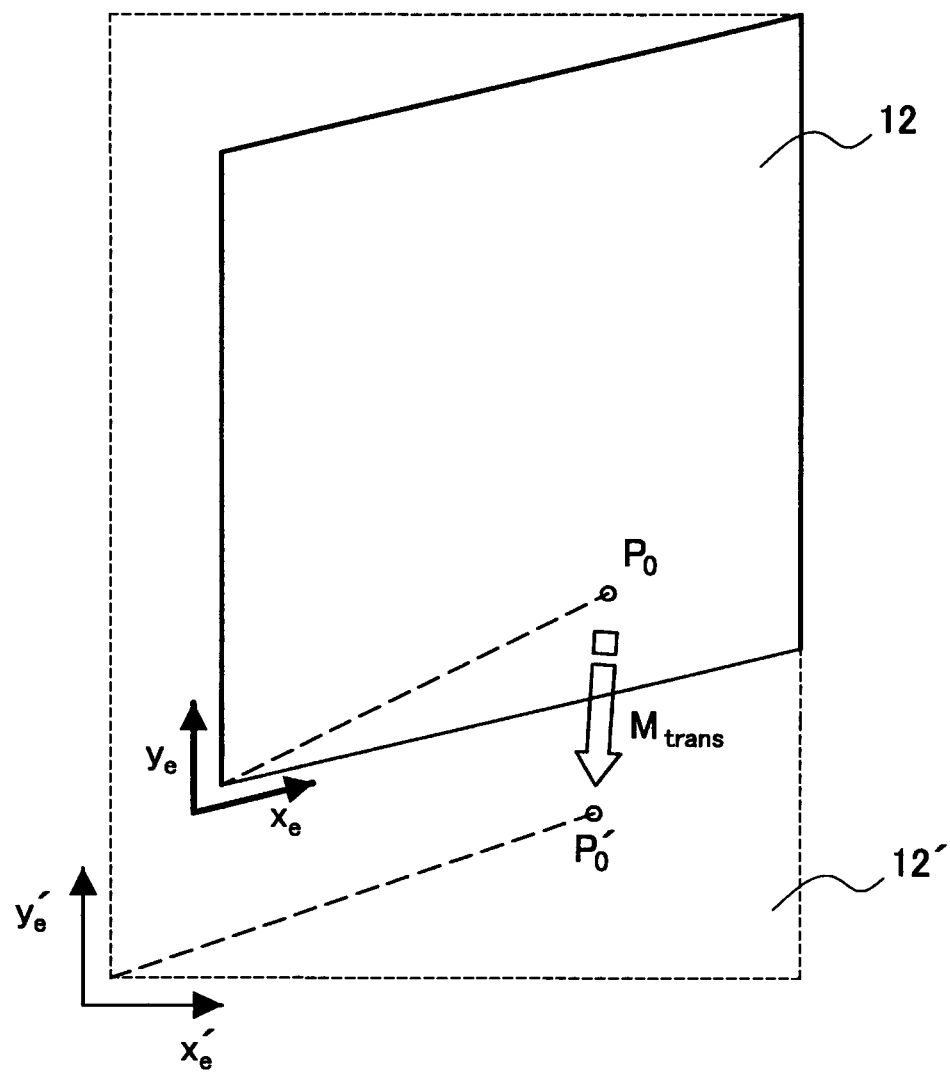
FIG. 6 is a diagram for describing a second example of the generation method of an aligned image by the generation unit.

In a second method, the generation unit 160 generates the aligned image by applying two-dimensional Affine transformation on a partial region, in the input image, corresponding to the recognized real object. Referring to FIG. 6, a state is shown where the rectangular pattern on the front face of the real object 12 is shown in the input image in a skewed manner. Here, two basis vectors in the plane of the real object 12 are taken as $x_e$ and $y_e$. Also, two basis vectors that are orthogonal within the image plane are taken as $x'_e$ and $y'_e$. Then, a transformation matrix $M_{trans}$ of Affine transformation for changing the shape of the partial region corresponding to the real object 12 such that the partial region appears rectangular may be derived by the following formula.

$$M_{trans} = (x'_e, y'_e)(x_e, y_e)^{-1} \qquad (1)$$

The generation unit 160 can generate the aligned image by mapping, using such transformation matrix $M_{trans}$, the pixel position of each pixel in the partial region, in the input image, corresponding to the real object 12 to a pixel position after processing in the aligned image. In the example of FIG. 6, a case is shown in which a pixel position $P_0$ in the partial region in the input image is mapped to a pixel position $P_0'$ in the aligned image by the transformation matrix $M_{trans}$.

Additionally, the first method and the second method described above may also be applied to a case in which the base plane of the real object is a plane other than the front face of the real object. Also, in both of the first method and the second method, the generation unit 160 may enlarge (or reduce) the size of the real object 12 in the aligned image so that information expressed by the real object 12 will be of a size suitable for reading.

Also, the generation unit 160 may also process a peripheral region of the partial region according to the amount of processing on the real object which is the target of alignment, from the input image to the aligned image. In the first method, the amount of processing from the input image of the real object to the aligned image means the amount of rotation of the three-dimensional rotation of the viewpoint or the real object in the three-dimensional rendering. In the second method, the amount of processing from the input image of the real object to the aligned image means the amount of translation and rotation of the pixel position by the transformation matrix $M_{trans}$. When such processing is performed, although the image of the peripheral region will be skewed, the visual continuity between the real object shown in the input image and its periphery can be maintained in the aligned image. A user is thereby enabled to easily understand which real object shown in the input image has been processed.

Furthermore, in the case reading of information expressed by the real object is expected to be difficult also in the aligned image, the generation unit 160 may replace the image of the partial region of the real object with another image. For example, the image DB 162 stores in advance, in association with each other, an image obtained by capturing at a high resolution the front face of each real object that is the target of recognition by the image processing apparatus 100 and the identifier of each real object. The generation unit 160 can thereby acquire from the image DB 162 an image related to a real object input from the image recognition unit 140 using the identifier of the real object, and replace the image of the partial region with the acquired image.

(5-2) Specifying of Target Real Object

As illustrated in FIG. 4, a plurality of real objects may be recognized in the input image. In such a case, the generation unit 160 may determine the real object to be aligned in parallel according to explicit specifying by a user. Specifying of a real object may be performed by a touch on the touch sensor or a click using a pointing device, on a determination area that is associated with the real object, for example. Also, the generation unit 160 may specify a real object whose base plane has the largest angle to the image plane or a real object with the largest partial region in the input image as the real object to be aligned in parallel. Also, the generation unit 160 may align in the aligned image all of the plurality of real objects in the input image in parallel with the image plane.

(6) Display Control Unit

In the normal display mode, the display control unit 170 displays the input image on the screen of the display unit 112. Also, in the aligned display mode, the display control unit 170 displays the aligned image generated by the generation unit 160 on the screen of the display unit 112.

The trigger for shifting from the normal display mode to the aligned display mode may be the detection of the first user input described above. The first user input may include a touch input to the touch sensor or a motion of the image processing apparatus 100 detected by the motion sensor, for example. Also, the display control unit 170 may shift to the aligned display mode when either of the following conditions is satisfied:

a) the angle of the base plane of the real object shown in the input image (the "angle of orientation" of the real object) to the image plane exceeds a threshold, or b) the size of the partial region, in the input image, corresponding to the recognized real object falls below a threshold.

If these conditions are satisfied, it is indicated that reading of information expressed by each real object is difficult. Thus, it is beneficial to automatically display, even without a user input, the aligned image suitable for reading information if either of the conditions is satisfied.

Also, in the case the second user input is detected in the aligned display mode, the display control unit 170 ends the display of the aligned image, and returns to the normal display mode. The second user input may be a user input of the same type as the first user input, or may be a user input of a different type from the first user input. Furthermore, the display control unit 170 may return to the normal display mode in the case a time has passed after shifting to the aligned display mode.

At the time of shifting from the normal display mode to the aligned display mode, the display control unit 170 may display by the display device an animation according to which the input image is gradually changed into a processed image. This animation is an animation according to which the base plane of the target real object is gradually aligned to be in parallel with the image plane, for example. In this case, a plurality of intermediate images in which the attitude of the real object is gradually changed between the input image and the aligned image are generated by the generation unit 160, and these intermediate images are sequentially displayed by the display device by the display control unit 170. The continuity between the input image and the aligned image sensed by the user may be thereby enhanced. Accordingly, the user can intuitively and easily understand which real object shown in the input image has been processed.

Also, in the aligned display mode, the display control unit 170 may further display on the screen a virtual object related to the target real object that is displayed in parallel with the image plane, and may make the virtual object operable by the user. The virtual object here may be an annotation of the so-called Augmented Reality (AR), and may include an object expressing information content (for example, navigation information, advertisement information, shop information, news, or the like) related to each real object. For example, the display control unit 170 changes the state of the virtual object in the case a third user input for the virtual object is detected by the detection unit 150. The state of the virtual object may include the position, the attitude, the size, the scroll position, or the like of the virtual object (for example, the information content is scrolled in the case the virtual object is dragged, and the information content is enlarged in the case the virtual object is pinched out). In the present embodiment, the visibility of information expressed by the real object is enhanced by the display of the aligned image, and thus operation of the virtual object related to the real object is also made easier for the user.

3. Example of Image to be Displayed

Next, examples of an image that may be displayed in the present embodiment will be described with reference to FIGS. 7 to 11.

Figure 7:
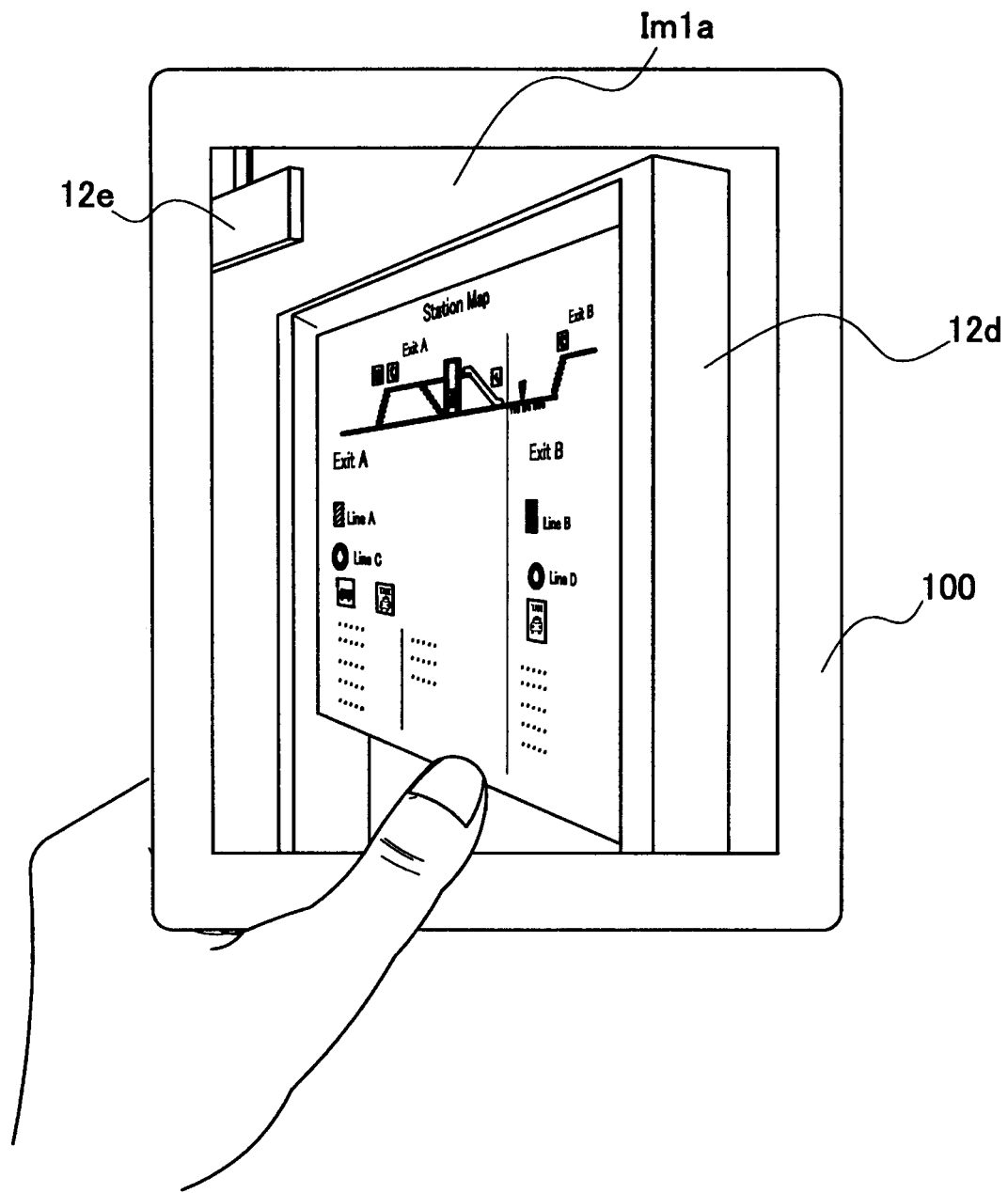
FIG. 7 is a diagram showing an example of an input image displayed by an image processing apparatus according to an embodiment.

Referring to FIG. 7, an input image Im1a is displayed on the screen of the image processing apparatus 100. A real object 12d and a real object 12e are shown in the input image Im1a. The image recognition unit 140 of the image processing apparatus 100 recognizes that the real object 12d and the real object 12e are shown in the input image Im1a, and also the position and the attitude of each real object. It is assumed that a first user input (e.g., a tap by the user on a determination area of the real object 12d, for example) which is the trigger for display of an aligned image is detected in this situation by the detection unit 150. Then, the generation unit 160 generates an aligned image which has been processed such that the front face of the real object 12d is aligned in parallel with the image plane.

Figure 8:
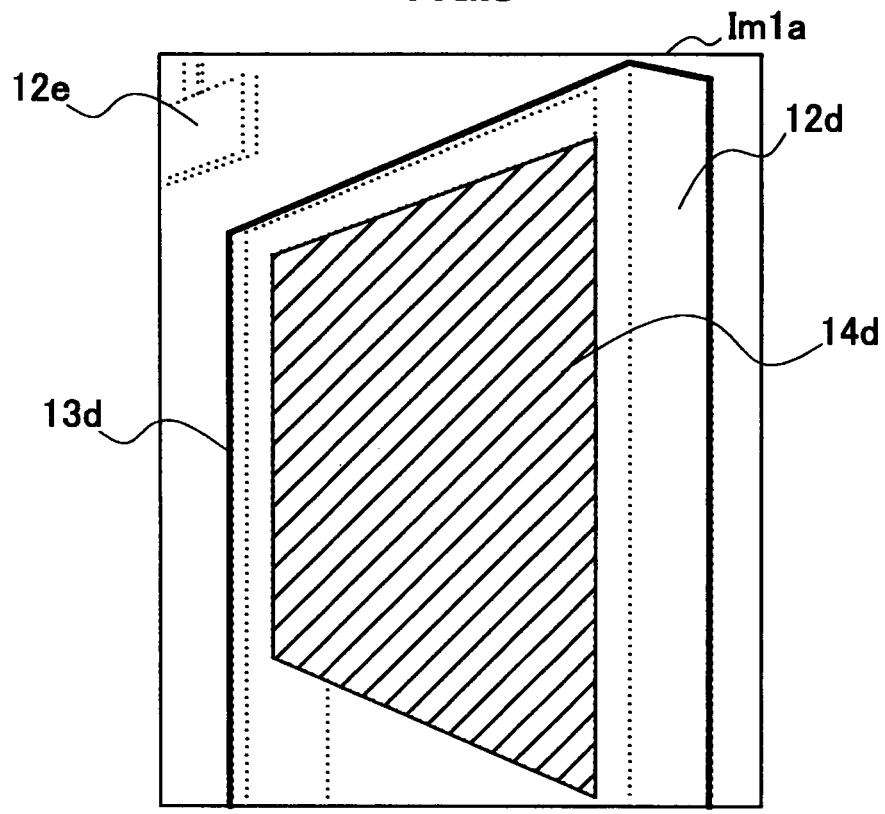
FIG. 8 is a first diagram for describing a process on the input image illustrated in FIG. 7.
Figure 9:
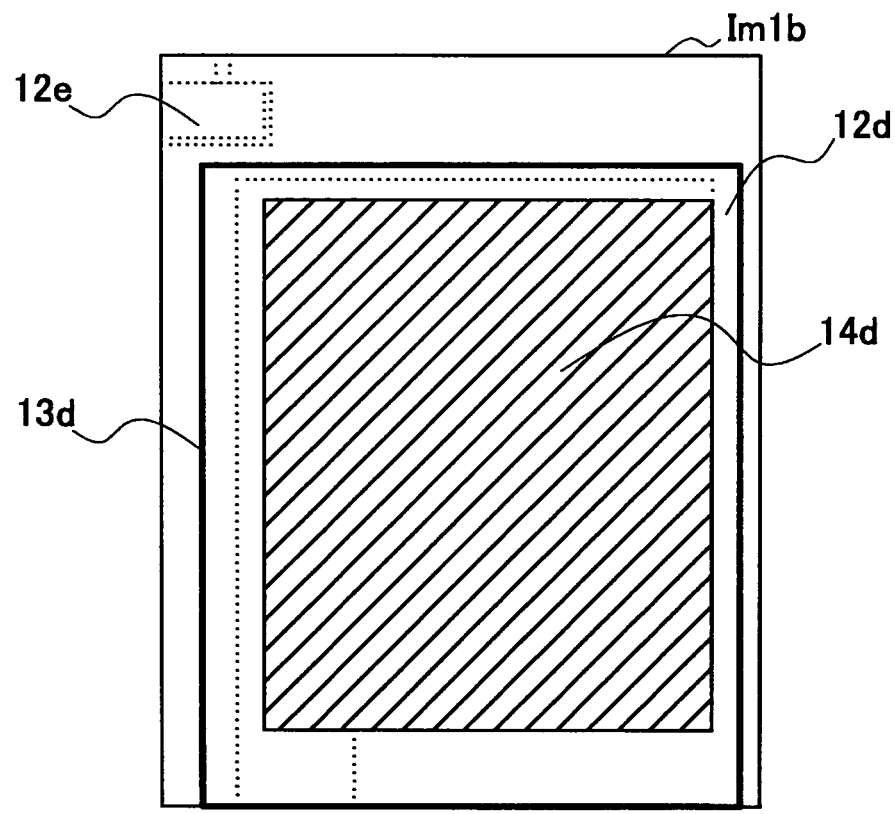
FIG. 9 is a second diagram for describing a process on the input image illustrated in FIG. 7.

Referring to FIG. 8, a partial region of the real object 12d recognized within the input image Im1a is surrounded by a frame 13d. The partial region of the real object 12d includes a rectangular pattern 14d that is shown being shaded by diagonal lines in the drawing. The generation unit 160 generates an aligned image in such a way that the rectangular pattern 14d of the real object 12d appears substantially rectangular within the aligned image. Referring to FIG. 9, the rectangular pattern 14d and the frame 13d surrounding the partial region of the real object 12d within an aligned image Im1b generated from the input image Im1a are shown. The rectangular pattern 14d is substantially rectangular in the aligned image Im1b. Furthermore, in the present embodiment, the generation unit 160 processes not only the partial region of the real object which is to be aligned in parallel but also the peripheral region of the partial region. In the example of FIG. 9, it is shown that not only the partial region of the real object 12d surrounded by the frame 13d but also the peripheral region where a real object 12e is shown is processed.

Figure 10:
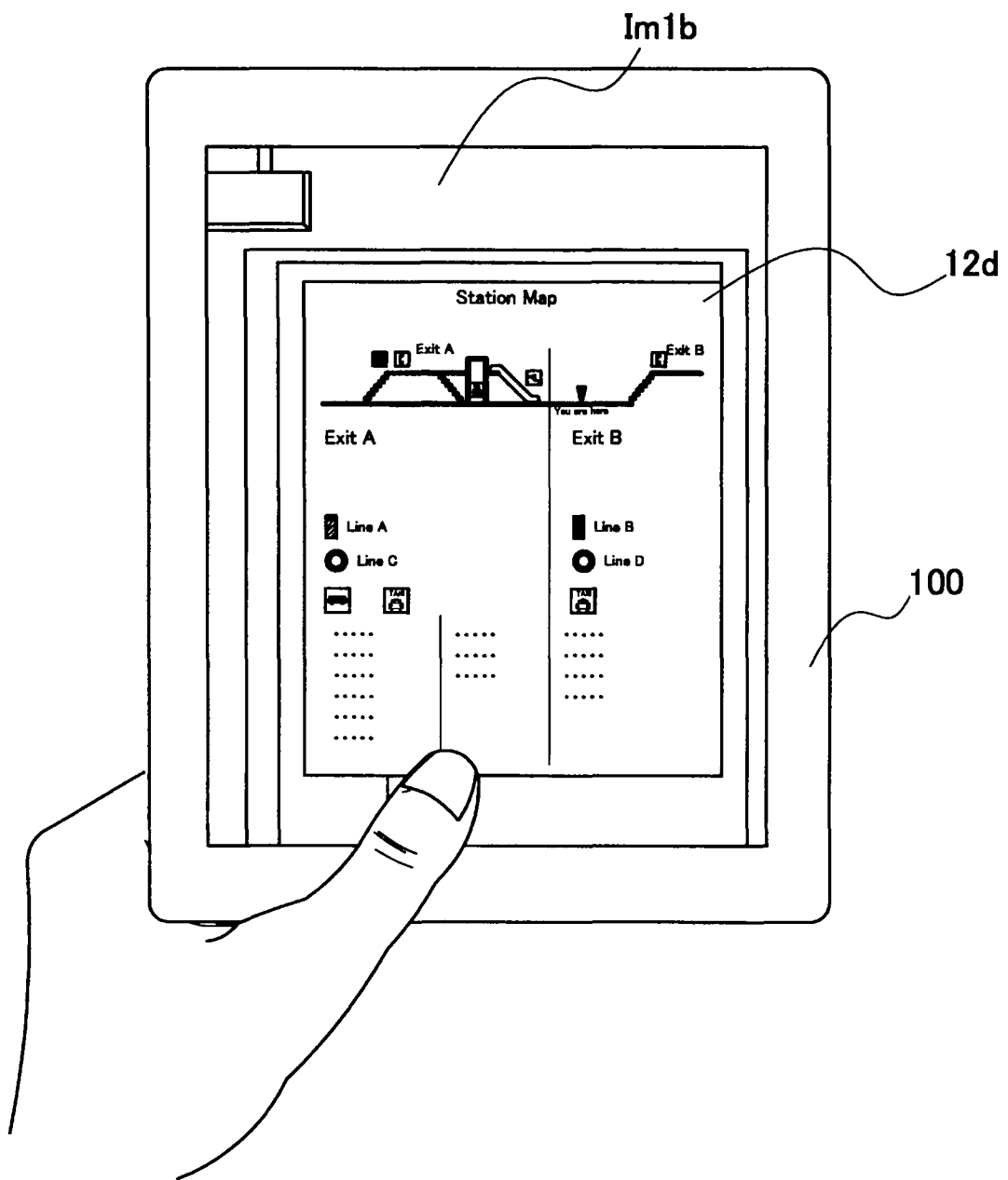
FIG. 10 is a diagram showing an example of an aligned image generated from the input image illustrated in FIG. 7.

Referring to FIG. 10, the aligned image Im1b generated by the generation unit 160 is displayed on the screen of the image processing apparatus 100. The user can view information expressed by the real object 12d from the front of the real object 12d by referring to the aligned image Im1b as above.

Figure 11:
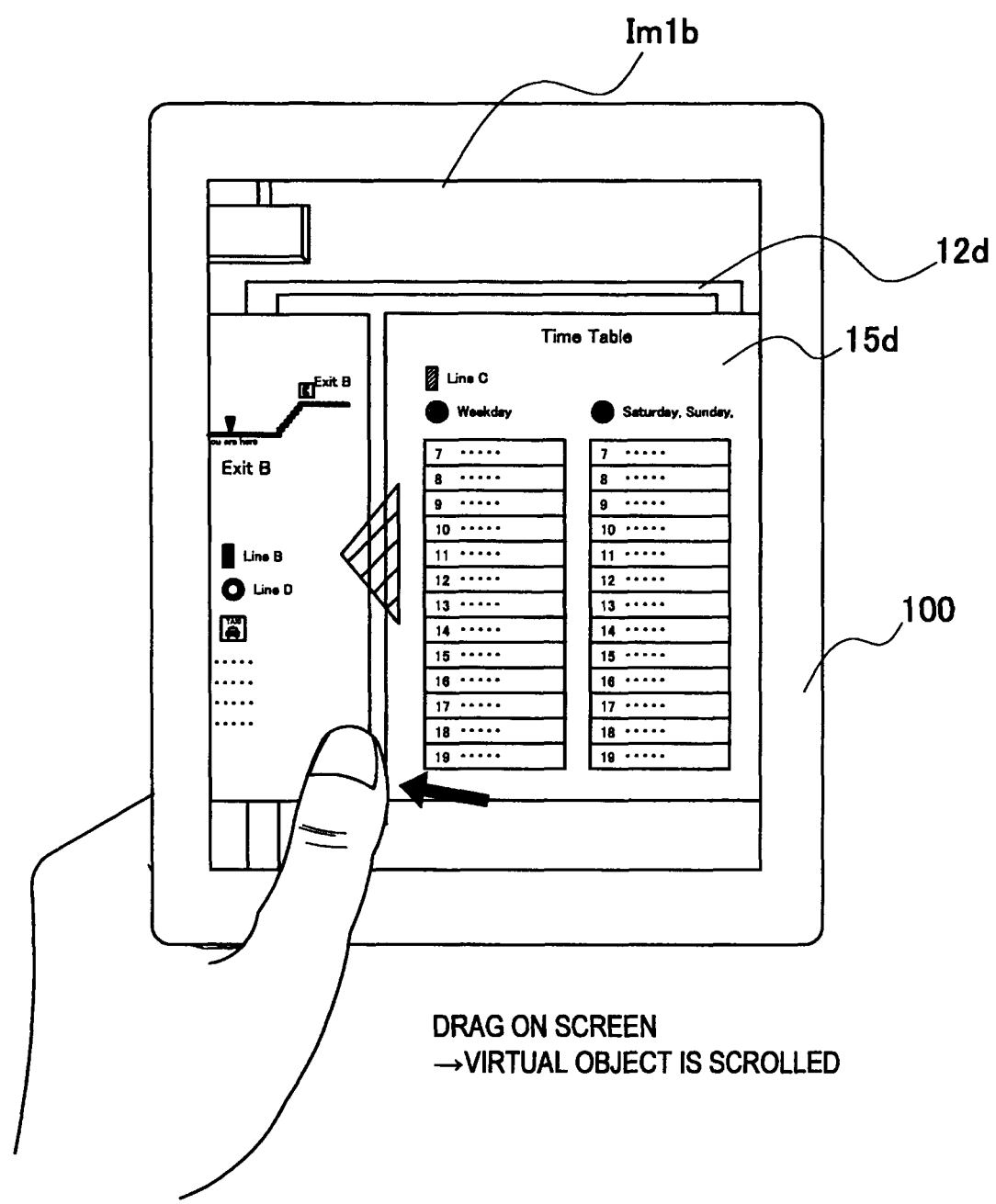
FIG. 11 is a diagram for describing an example of operation of a virtual object related to the aligned image illustrated in FIG. 10.

Furthermore, the display control unit 170 of the image processing apparatus 100 may superimpose, in a state where the aligned image is displayed, a virtual object related to the real object that is aligned in parallel with the image plane onto the aligned image and display the same. Furthermore, the virtual object may be operable by the user. Referring to FIG. 11, a virtual object 15d is superimposed onto the real object 12d shown in the aligned image Im1b illustrated in FIG. 10. A state is shown in FIG. 11 where the virtual object 15d is scrolled to the left by the user dragging the virtual object 15d on the screen, for example. Additionally, the virtual object to be superimposed onto the aligned image may be a real object image of a higher resolution, a real object image with added amount of information, texts, an icon or an image expressing certain information related to the real object, or the like.

4. Flow of Process

Figure 12:
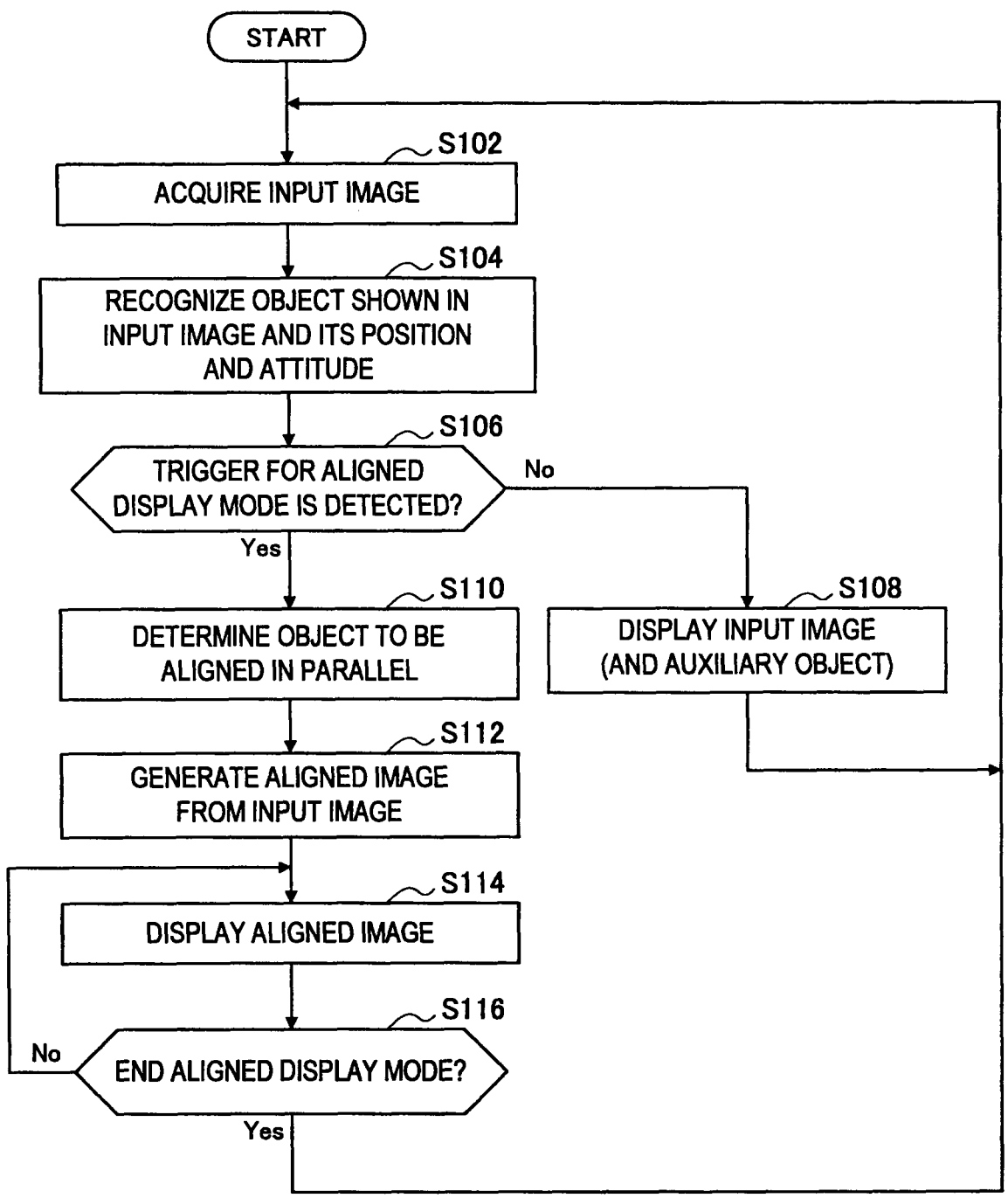
FIG. 12 is a flow chart showing an example of the flow of a process by an image processing apparatus according to an embodiment.

FIG. 12 is a flow chart showing an example of the flow of a process by the image processing apparatus 100 according to the present embodiment. Additionally, the image processing apparatus 100 is assumed to be in the state of the normal display mode at the time of start of the process shown in FIG. 12.

Referring to FIG. 12, first, the image acquisition unit 130 acquires as an input image, for example, an image showing the real space (step S102). Next, the image recognition unit 140 recognizes which real object(s) are shown in the input image acquired by the image acquisition unit 130, and also recognizes the three-directional position and attitude of the real object(s) shown in the input image (step S104).

Then, the display control unit 170 may determine whether the trigger for shifting to the aligned display mode has been detected or not (step S106). In the case the trigger for the aligned display mode has not been detected, the display control unit 170 causes the input image acquired by the image acquisition unit 130 to be displayed on the screen (step S108). The display control unit 170 may then superimpose a certain virtual object onto the input image. For example, auxiliary virtual object(s) (such as the frame 13d in FIG. 8) indicating the position and attitude of the real object(s) recognized by the image recognition unit 140, or an auxiliary virtual object indicating the above-described determination area of each real object may be superimposed onto the input image. Then, the process returns to step S102.

In the case the trigger for shifting to the aligned display mode has been detected in step S106, the process proceeds to step S110. In step S110, the generation unit 160 determines which real object shown in the input image is to be aligned in parallel, according to explicit specifying by the user or the size or the attitude of each real object in the input image (step S110). Then, the generation unit 160 generates an aligned image by processing the input image such that the base plane (for example, the front face) of the determined real object is aligned in parallel to the image plane (step S112). Then, the display control unit 170 causes the aligned image generated by the generation unit 160 to be displayed on the screen (step S114).

Then, when a trigger for ending the aligned display mode (for example, the second user input described above, lapse of a time, or the like) is detected, the state of the image processing apparatus 100 is returned to the normal display mode, and the process returns to step S102 (step S116).

5. Summary

In the foregoing, an embodiment of the present technology has been described in detail with reference to FIGS. 1 to 12. According to the above-described embodiment, an input image is processed such that the base plane of a real object shown in the input image faces the image plane, and the processed image is displayed. Accordingly, the base plane of a real object expressing certain information in the real world can be easily turned to the direction of the reader. Display of the processed image may be performed with a touch on the screen, a motion of the terminal, or the like as the trigger. Also, since the visibility of the information expressed by the real object is enhanced by the display of the processed image, operation of a virtual object (for example, an annotation of an AR application) displayed in association with the real object shown in the processed image also becomes easy for the user.

Furthermore, according to the present embodiment, the processed image may be displayed also when the angle of the base plane of the recognized real object to the image plane exceeds a threshold, or when the size of a partial region, in the input image, corresponding to the real object falls below a threshold. Accordingly, in a situation where reading of information expressed by each real object is difficult, an image suitable for reading of the information can be provided to the user without waiting for a user input.

Furthermore, according to the present embodiment, at the time of generation of the processed image, not only the partial region corresponding to the real object but also a peripheral region of the partial region is also processed likewise to the real object. Accordingly, the visual continuity between the real object shown in the input image and its periphery is maintained also in the processed image. The user is thereby enabled to easily understand which real object shown in the input image has been processed.

Furthermore, the process by the image processing apparatus 100 described in the present specification may be realized by using any of software, hardware, and a combination of software and hardware. Programs configuring the software are stored in advance in a storage medium provided within or outside the device, for example. Each program is loaded into a RAM (Random Access Memory) at the time of execution, and is executed by a processor such as a CPU (Central Processing Unit), for example.

Additionally, in the present embodiment, an example has been mainly described where the processed image is displayed on the screen of the display unit 112 of the image processing apparatus 100. However, as another embodiment, the processed image may be generated from the input image at an image processing apparatus that receives the input image from a terminal device carried by the user, based on the recognition result of the attitude of the real object shown in the input image. In this case, the generated processed image may be transmitted from the image processing apparatus to the terminal device, and the processed image may be displayed on the screen of the terminal device.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An image processing apparatus including:

an image acquisition unit for acquiring an input image showing a real space;

a recognition unit for recognizing an attitude of a real object shown in the input image;

a generation unit for generating from the input image a processed image which has been processed such that a base plane of the real object recognized by the recognition unit faces an image plane of the input image; and a display control unit for causing a display device to display the processed image generated by the generation unit.

(2)

The image processing apparatus according to (1), wherein the base plane is a front face of the real object, and wherein the processed image is an aligned image which has been processed such that the front face of the real object is aligned in parallel to the image plane.

(3)

The image processing apparatus according to (2), wherein the real object is a substantially planar real object having a rectangular pattern, and wherein the aligned image is an image which has been processed such that the rectangular pattern appears substantially rectangular.

(4)

The image processing apparatus according to (3), wherein the generation unit generates the aligned image by three-dimensionally rotating a viewpoint for three-dimensional rendering or the real object such that the viewpoint will be positioned in a front direction of the real object.

(5)

The image processing apparatus according to (3), wherein the generation unit generates the aligned image by applying a two-dimensional Affine transformation on a partial region, within the input image, corresponding to the real object.

(6)

The image processing apparatus according to (4) or (5), wherein the generation unit also processes a peripheral region of the partial region corresponding to the real object within the input image according to an amount of processing on the real object from the input image to the aligned image.

(7)

The image processing apparatus according to any of (1) to (6), wherein the display control unit causes the display device to display the processed image in a case a first user input is detected in a state where the real object is recognized.

(8)

The image processing apparatus according to (7), wherein the display control unit causes the display device to display the input image in a case a second user input is detected in a state where the processed image is displayed.

(9)

The image processing apparatus according to any of (1) to (6), wherein the display control unit causes the display device to display the processed image in a case an angle of a front face of the real object to the image plane exceeds a predetermined threshold.

(10)

The image processing apparatus according to any of (1) to (6), wherein the display control unit causes the display device to display the processed image in a case a size of a partial region corresponding to the real object in the input image falls below a predetermined threshold.

(11)

The image processing apparatus according to any of (1) to (10), wherein the display control unit causes the display device to display, at a time of display of the processed image, an animation in which the input image is gradually changed into the processed image.

(12)

The image processing apparatus according to any of (1) to (11), wherein, in a case the processed image is displayed, the display control unit causes the display device to display a virtual object related to the real object, and causes the virtual object to be operable by a user.

(13)

An image processing method including:

acquiring an input image showing a real space;

recognizing an attitude of a real object shown in the input image;

generating from the input image a processed image which has been processed such that a base plane of the recognized real object faces an image plane of the input image; and causing a display device to display the generated processed image.

(14)

A program for causing a computer for controlling an image processing apparatus to function as:

an image acquisition unit for acquiring an input image showing a real space;

a recognition unit for recognizing an attitude of a real object shown in the input image;

a generation unit for generating from the input image a processed image which has been processed such that a base plane of the real object recognized by the recognition unit faces an image plane of the input image; and a display control unit for causing a display device to display the processed image generated by the generation unit.

The invention claimed is:

1. An apparatus comprising:

circuitry configured to determine a display mode of a virtual object from among a plurality of display modes based on a positional relationship between the apparatus and a real object identified by analyzing image data of a real space, control display of the virtual object according to the determined display mode, switch the display mode of the virtual object to a different display mode of the plurality of display modes based on a user input, and control display of the virtual object according to the switched display mode, wherein, in a first display mode of the plurality of display modes, the virtual object is moved in accordance with movement of the apparatus on which the virtual object is displayed and the positional relationship between the apparatus and the real object, wherein, in a second display mode of the plurality of display modes, a position of the virtual object is fixed with respect to the real object regardless of the movement of the apparatus, and wherein the user input to switch the display mode of the virtual object includes a drag operation performed in relation to a position where the virtual object is displayed.

2. The apparatus according to claim 1,
wherein the apparatus further comprises a display device, and
wherein the display device comprises a head-mounted display (HMD).

3. The apparatus according to claim 1, wherein when the display mode is switched between the first display mode and the second display mode based on the user input, the circuitry controls the display of the virtual object such that the virtual object is displayed with a predetermined animation.

4. The apparatus according to claim 3,
wherein the virtual object comprises an augmented reality avatar positioned in spatial relation to a recognized surface in a captured real space.

5. The apparatus according to claim 4, wherein the predetermined animation comprises the avatar performing a jump.

6. A method, implemented via at least one processor, the method comprising:
   determining a display mode of a virtual object from among a plurality of display modes based on a positional relationship between an apparatus and a real object identified by analyzing image data of a real space;
   controlling display of the virtual object according to the determined display mode;
   switching the display mode of the virtual object to a different display mode of the plurality of display modes based on a user input; and
   controlling display of the virtual object according to the switched display mode,
   wherein, in a first display mode of the plurality of display modes, the virtual object is moved in accordance with movement of the apparatus on which the virtual object is displayed and the positional relationship between the apparatus and the real object,
   wherein, in a second display mode of the plurality of display modes, a position of the virtual object is fixed with respect to the real object regardless of the movement of the apparatus, and
   wherein the user input to switch the display mode of the virtual object includes a drag operation performed in relation to a position where the virtual object is displayed.

7. A non-transitory computer-readable medium having embodied thereon a program, which when executed by a computer causes the computer to execute a method, the method comprising:
   determining a display mode of a virtual object from among a plurality of display modes based on a positional relationship between an apparatus and a real object identified by analyzing image data of a real space;
   controlling display of the virtual object according to the determined display mode;
   switching the display mode of the virtual object to a different display mode of the plurality of display modes based on a user input; and
   controlling display of the virtual object according to the switched display mode,
   wherein, in a first display mode of the plurality of display modes, the virtual object is moved in accordance with movement of the apparatus on which the virtual object is displayed and the positional relationship between the apparatus and the real object,
   wherein, in a second display mode of the plurality of display modes, a position of the virtual object is fixed with respect to the real object regardless of the movement of the apparatus, and
   wherein the user input to switch the display mode of the virtual object includes a drag operation performed in relation to a position where the virtual object is displayed.

8. The apparatus according to claim 1, wherein the second display mode is an aligned mode in which the virtual object is aligned with a surface of the real object.

9. The apparatus according to claim 3, wherein the predetermined animation includes intermediate images of the virtual object sequentially displayed between a position where the virtual object is displayed in the first display mode and a position where the virtual object is display in the second display mode.

* * * * *